United States Patent Office 2,765,190
Patented Oct. 2, 1956

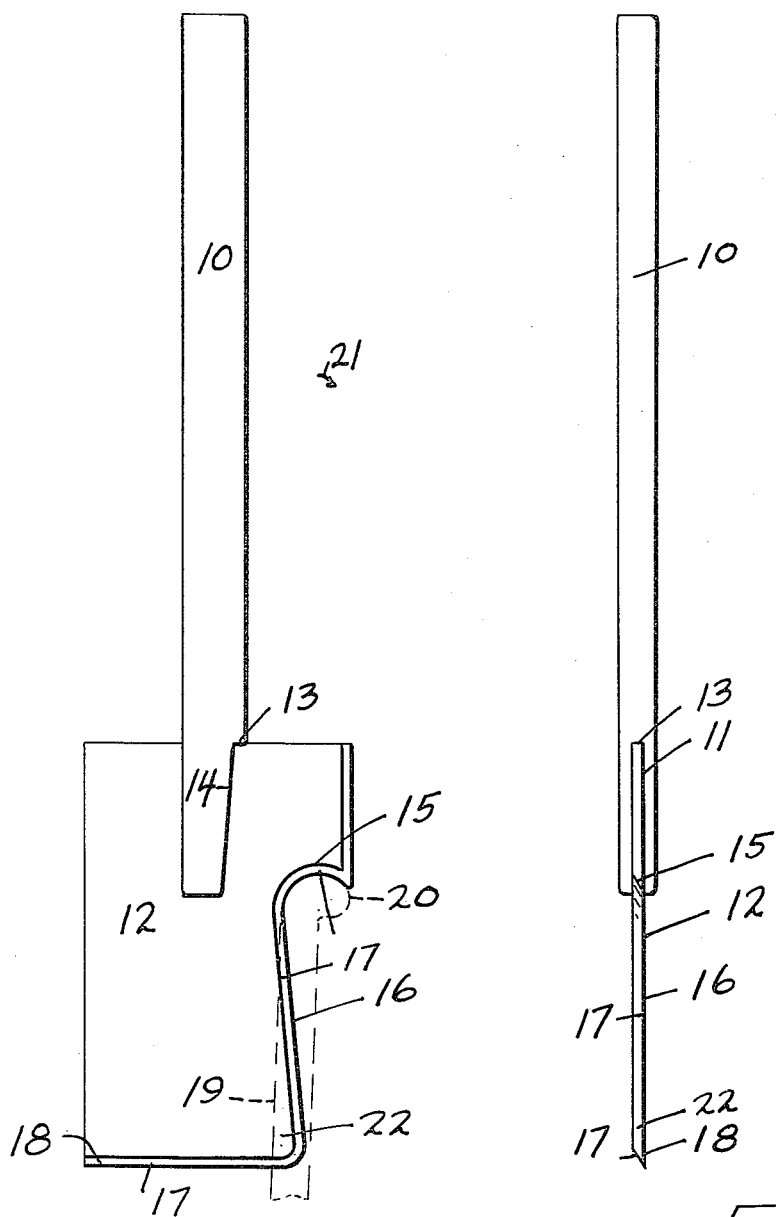

2,765,190
SPATULA
Junia B. McAhren, Sioux City, Iowa
Application January 5, 1955, Serial No. 480,004
2 Claims. (Cl. 294—7)

My invention relates to a spatula.

An object of my invention is to provide a special type of spatula which besides acting as a stirring or other medium, will also provide efficient means whereby the side of a mixing bowl or the like can be readily scraped or cleaned, the spatula further including an upper shoulder portion which will clean the upper rim of the bowl at the same time, this spatula having certain other advantages which will be apparent.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a forward elevation of the spatula, and

Figure 2 is an end view of Figure 1.

My invention contemplates the provision of a spatula having certain resilient features, and in which the spatula, besides providing the ordinary usage such as mixing and the like, also includes attendant means wherein it can be used to scrape the side of a mixing bowl or similar vessel, and also the upper annular rim thereof, the spatula including certain other desirable features as will be explained.

I have used the character 10 to designate the handle of the spatula, which handle can be made of any desired material, the handle 10 including the slotted portion at 11 in which is snugly received the flat and resilient spatula member 12, the member 12 being preferably made of a high grade rubber having suitable resilient characteristics. The character 13 indicates a shoulder in the handle 10 which will provide greater resiliency to the spatula since this provides a portion 14 further from the edge thereof, the member 12 being secured in the slotted portion 11 in any suitable manner.

The spatula member 12 includes an arcuate shoulder at 15 which extends downwardly into the edge 16 which edge extends slightly outwardly as shown, the portions 15 and 16 being bevelled as at 17, and the bottom edge 18 of the spatula can be bevelled if desired as shown.

It will now be obvious that the resilient spatula member 12 will permit mixing, etc. and scraping of the bowl, and it will be observed from Figure 1 that the spatula can be used to efficiently scrape the side of a bowl, the inner wall of which is indicated by the dotted lines character 19, it being also noted that the upper shoulder 20 of the bowl can be efficiently cleaned at the same time, the edge 16 also permitting cleaning of a bowl side of varying angularity or slope, due to the fact that the handle 10 can be rotated in the direction of the arrow 21 to accommodate various slopes.

It will be noted in Figure 1 also that when cleaning the bowl, a certain portion 22 will fold flat against the bowl side due to the resiliency of the material of the spatula member 12, thereby providing a very snug engagement and a better cleaning action.

It will now be seen that I have provided the advantages mentioned in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A spatula comprising a handle, a resilient spatula member secured to said handle, said resilient spatula member having vertically positioned sides, one of said sides having an indented portion for scraping the sides of bowls, said side further including an upper arcuate portion for cleaning a bowl rim, said arcuate portion merging with said indented portion.

2. A spatula comprising a handle, a resilient spatula member secured to said handle, said resilient spatula member having vertically positioned sides, one of said sides having an indented portion for scraping the sides of bowls, said side further including an upper arcuate portion for cleaning a bowl rim, said arcuate portion merging with said indented portion, said indented portion sloping generally downwardly and outwardly to provide an extending flap portion.

References Cited in the file of this patent

UNITED STATES PATENTS 2,485,521  Wendt _____ Oct. 18, 1949